Figure 1:
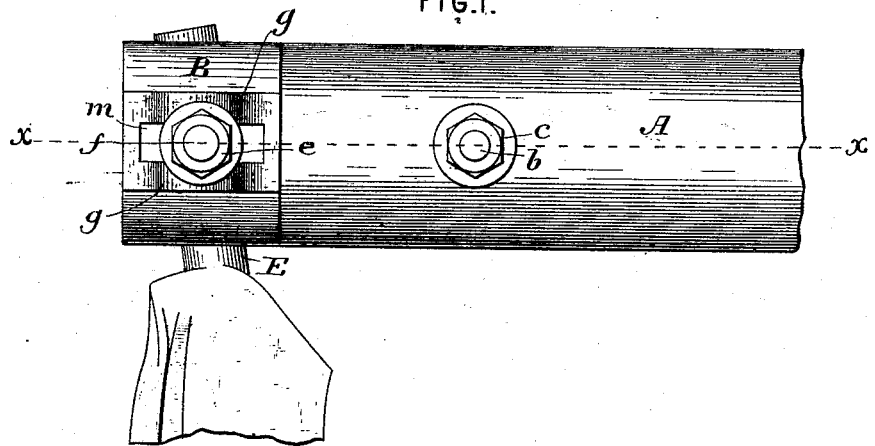

(No Model.)

D. W. MARSTON.
SCYTHE SNATH FASTENER.

No. 349,353. Patented Sept. 21, 1886.

ATTEST-
J. Henry Kaiser
Harry L. Amer.

INVENTOR -
David W. Marston
J. N. McEntire
his atty.

UNITED STATES PATENT OFFICE.

DAVID W. MARSTON, OF LEBANON, NEW HAMPSHIRE, ASSIGNOR OF THREE-FOURTHS TO MARTIN V. PURMOST, HENRY M. DAY, AND MILO L. STEARNS, ALL OF SAME PLACE, AND DERBY & BALL, OF BELLOWS FALLS, VT.

SCYTHE-SNATH FASTENER.

SPECIFICATION forming part of Letters Patent No. 349,353, dated September 21, 1886.

Application filed January 22, 1886. Serial No. 189,385. (No model.)

*To all whom it may concern:*

Be it known that I, DAVID W. MARSTON, of Lebanon, in the county of Grafton and State of New Hampshire, have invented certain new and useful Improvements in Scythe-Snath Fasteners and Scythe-Shanks; and I do hereby declare that the following is a full, clear, and exact description thereof, reference being had to the accompanying drawings, making part of this application.

My invention relates to that type of scythe-snath fasteners which have shanks projecting substantially in line with the blade, and is an improvement upon the contrivance made the subject of United States Letters Patent granted to me August 26, 1884, No. 304,211. In the scythe-snath fastener made the subject of said patent the shank of the scythe-blade to be used in connection therewith must be round or cylindrical, and the dip of the blade can be varied only by turning such round shank within the round hole or eye of the clamping loop-bolt; hence the securement of the scythe-blade in position must depend upon the frictional contact between a portion of the round shank's surface and a portion of the surface of the bolt's eye, and the frictional contact between another portion of the round shank's surface and the half-round surface of a metallic device against which said shank is seated in drawing home the loop-bolt. In such an organization or contrivance the round shank of the scythe-blade must be clamped with great force to insure its retention in place, since the surfaces of frictional contact are comparatively close to the axis of motion.

I propose by my present invention to dispense with the circular hole or eye in the loop-bolt, and to adapt this eye to the use of scythe-blades having shanks not round, but with a flattened side, (or of any polygonal shape in cross-section,) so that the scythe-shank cannot turn at all within the eye of the loop-bolt; and to effect the necessary adjustment of the scythe-blade I propose to have the loop-bolt arranged to vibrate about an axis substantially coincident with the axis on which the shank and its blade must turn to vary the dip of the latter; and to carry into effect this novel principle of construction, whereby I am enabled to secure the movable parts in place by the frictional contact of the loop-bolt's nut upon a fixed surface comparatively distant from the center of motion of the scythe-shank, I make the lower end of the snath with a flaring mortise, and cut away the top side of the usual metallic ferrule, through which the upper end of the loop-bolt passes, so as to permit this end of said bolt to be moved back and forth, and I form or provide the upper part of the said ferrule with curved bearing-surfaces, against which may rest the base of the nut of the loop-bolt, all as will be hereinafter more fully explained.

To enable those skilled in the art to which my invention relates to make and use my improved fastener, I will now proceed to more fully explain my invention, referring by letters to the accompanying drawings, which form a part of this specification, and in which I have illustrated my invention carried out in that form in which I have so far successfully practiced it.

Figure 2:
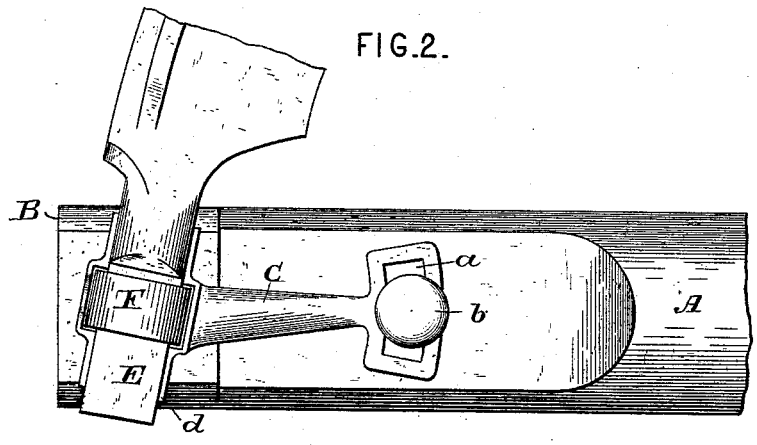
Figure 3:
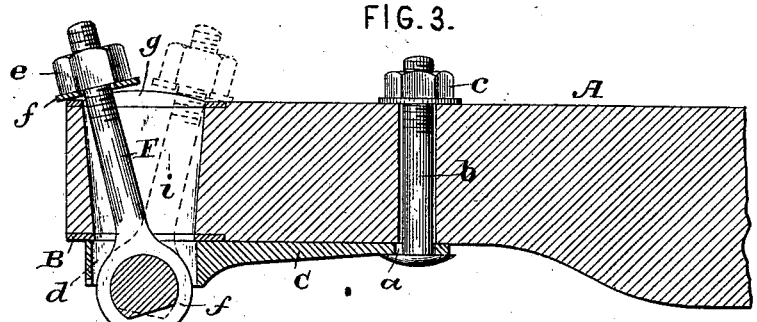

In the drawings, Figure 1 is a top view of the lower portion of a snath and part of a scythe secured together by means of my improved fastener. Fig. 2 is a bottom view of the same parts. Fig. 3 is a vertical section at the line *x x* of Fig. 1, and showing the adjusting loop-bolt in one position in full lines and in another position in dotted lines.

In the several figures the same part will be found designated by the same letter of reference.

A is the usual snath or handle, provided with a metallic ferrule, B, substantially such as seen in my patent hereinbefore referred to, except as to its being slotted at its top side, as I will presently explain, and C is a swinging plate slotted at *a*, and secured in any one of its positions by a clamping-bolt, *b*, and nut *c*, all as in the case of my patented fastener. In the like manner to said patented contrivance the plate C is also formed with a semi-cylindrical socket or seat at *d* for the side shank, E, to bear upwardly against, and is perforated with a rectangular hole for the accommodation of the body portion of the loop-bolt F, which latter is also substantially like the bolt in my patented fastener, except that its eye is not circular or round. The bolt F is secured in place by a nut, e, the base of which, or the washer f of which, bears against the curved bearing-surfaces g g of the metallic ferrule B. This ferrule is cut away, as seen at m, to permit the necessary vibration of the upper end of the swinging loop-bolt F, and for the same purpose the handle or snath A has a flaring mortise cut in it, as shown at i.

As will be best seen by reference to Fig. 3, the eye in the loop-bolt (and also the shank E) is formed not round, but with a flattened place, so that while the shank may be easily inserted within and removed from the eye of the bolt, and may be adjusted endwise therein, it cannot, even when the loop-bolt is not clamped fast in place, be turned round within the said eye. The bolt itself, however, when its nut e is loosened, may be swung or vibrated into different positions within the extreme range of motion permitted by the slot-mortise i, and indicated by the two positions in which the bolt is shown in full and in dotted lines at Fig. 3, and thereby the shank E will of course be turned in one direction or the other upon its axis of motion to vary the "dip" of the scythe-blade, as may be desired, and by turning home the nut e the scythe-blade will of course be secured firmly in place.

It will be seen that while, as in the case of my patented fastener, the drawing upwardly of the loop-bolt F clamps or presses the upper portion of the shank E of the scythe against the seat portion d of the plate C, it is not by the frictional contact of these parts that the shank E is prevented from turning, since it can under no circumstances turn around within the eye of the bolt, but by the prevention of any vibration of the bolt itself that the shank E is held fast in any given position; and it will be understood that by reason of the clamping or fastening being effected at the more distant locality of the bearing of the nut e, or of its washer, on the curved bearing-surfaces g g, the same degree of frictional resistance between said nut and the surfaces g g will be more efficient to prevent any movement of the clamped parts than in the case of a contrivance such as shown in my patent.

Of course the eye of the loop-bolt F may be varied in form from that shown, and other variations may be made without departing from the gist of my invention, so long as the described novel principle of construction and mode of operation be retained in the fastener.

Having now so fully explained my improved fastener that those skilled in the art can make and use my invention in either the precise form in which I have herein shown it or under some modification thereof, what I claim as new, and desire to secure by Letters Patent, is—

In combination with the usual snath, suitably mortised at i, and a shank-securing loop-bolt, F, having an eye which prevents the turning around therein, of a shank adapted thereto, the shank-seat d, and a ferrule slotted at m and formed or provided with curved bearing-surfaces at g g for the nut of said loop-bolt, all substantially as and for the purpose hereinbefore set forth.

In witness whereof I have hereunto set my hand this 15th day of January, 1886.

DAVID W. MARSTON.

In presence of—
F. DAVIS,
J. E. DEWEY.